UNITED STATES PATENT OFFICE.

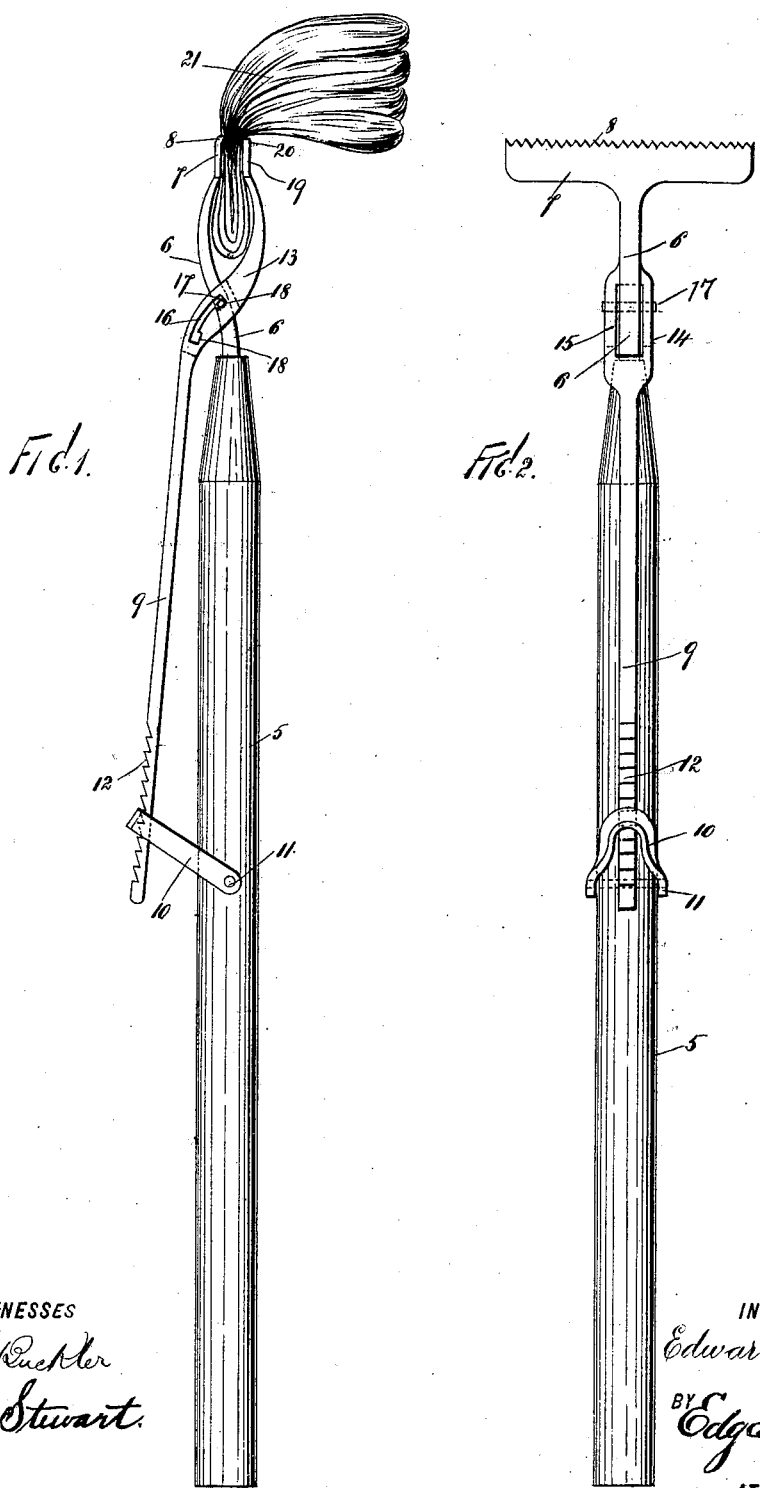

EDWARD DOBBINS, OF SARANAC LAKE, NEW YORK.

MOP-HANDLE.

SPECIFICATION forming part of Letters Patent No. 627,746, dated June 27, 1899.

Application filed October 22, 1898. Serial No. 694,349. (No model.)

*To all whom it may concern:*

Be it known that I, EDWARD DOBBINS, a citizen of the United States, residing at Saranac Lake, in the county of Franklin and State of New York, have invented certain new and useful Improvements in Handles for Mops, of which the following is a full and complete specification, such as will enable those skilled in the art to which it appertains to make and use the same.

This invention relates to mops; and the object thereof is to provide a handle for devices of this class provided with improved means for grasping and holding the mop.

The invention is fully disclosed in the following specification, of which the accompanying drawings form a part, in which—

Figure 1 is a side elevation of a device embodying my improvement and showing a mop held thereby; and Fig. 2 is a view of said device at right angles to that of Fig. 1, the mop being detached.

In the drawings forming part of this specification the separate parts of my improvement are designated by the same numerals of reference in each of the views, and in the practice of my invention I provide a device of the class herein described comprising a handle 5, which is provided at one end with a projecting shank 6, formed thereon or secured thereto, and said shank is curved outwardly and inwardly, as shown in Fig. 1, and provided with a transverse jaw 7, having inwardly-directed serrations or teeth 8 at its outer edge.

I also provide a supplemental bar or handle 9, which passes through a yoke 10, pivoted to the handle at 11, and which is provided with ratchet-teeth 12, in connection with which the yoke 10 operates, and the end of the supplemental handle or bar 9 opposite the yoke 10 is provided with a shank 13, which is curved similarly to the shank 6 and which is provided with an enlarged portion 14, having a longitudinal slot or opening 15, through which the shank 6 passes, and one side of the enlarged portion 14 of the shank 13 is provided with a segmental slot 16, through which passes a pin 17, secured to the shank 6, and the slot 16 is provided at each end with an angular notch or recess 18, also adapted to receive said pin, and by means of this construction the shank 13 of the supplemental handle or bar 9 may be adjusted transversely of the shank 6. The shank 13 is also provided at its outer end with a transverse jaw 19, having inwardly-directed serrations or teeth 20 at its outer edge, and it will be apparent that by manipulating the yoke 10 and the supplemental handle or bar 9 the jaws 7 and 19 may be separated or brought close together, as may be desired.

I have also shown in Fig. 1 a mop 21, which may be of any desired construction and which is adapted to be grasped by and held between the jaws 7 and 19, and by manipulating the yoke 10 the pressure applied to the mop by the jaws 7 and 19 may be regulated, as will be readily understood.

My improved handle is also adapted to grasp and hold a brush in place of the mop 21, and for this purpose the supplemental handle or bar 9 is adjusted so that the pin 17 will rest in the angular notch or recess 18 at the end of the segmental slot 16 adjacent to the yoke 10. This adjustment of the supplemental handle or bar 9 will enable the jaws 7 and 19 to be farther separated, while at the same time holding them in proper relative position to grasp the head of a brush or similar article.

My improvement is simple in construction and operation and well adapted to accomplish the result for which it is intended, and it will be apparent that changes in and modifications of the construction described may be made without departing from the spirit of my invention or sacrificing its advantages.

Having fully described my invention, I claim as new and desire to secure by Letters Patent—

1. The herein-described device for handling mops, brushes and similar articles, comprising a main handle having a curved shank at one end provided with a transverse jaw, and a supplemental handle or bar provided with a curved shank having a slot or opening through which said first-named shank passes, one side wall of said slot or opening being provided with a segmental slot at each end of which is an angular notch or recess, and a pin connected with the first-named shank and passing through said segmental slot, the shank on the supplemental handle or bar being also provided with a transverse jaw, and means for clamping said supplemental handle or bar, substantially as shown and described.

2. The herein-described device for handling mops, brushes and similar articles, comprising a main handle having a curved shank at one end provided with a transverse jaw, and a supplemental handle or bar provided with a curved shank having a slot or opening through which said first-named shank passes, one side wall of said slot or opening being provided with a segmental slot at each end of which is an angular notch or recess, and a pin connected with the first-named shank and passing through said supplemental slot, the shank on the supplemental handle or bar being also provided with a transverse jaw, and means for clamping said supplemental handle or bar, consisting of ratchet-teeth formed in one end thereof, and a yoke pivotally connected with the main handle through which said bar passes, substantially as shown and described.

3. The herein-described device for handling mops, brushes and similar articles, comprising a main handle provided at one end with a curved shank having a transverse jaw, a supplemental handle or bar provided with a similar curved shank connected with and slidably adjustable on the first-named shank and provided with a transverse jaw, and means for clamping said supplemental handle or bar, substantially as shown and described.

4. The herein-described device for handling mops, brushes and similar articles, comprising a main handle provided at one end with a curved shank having a transverse jaw, a supplemental handle or bar provided with a similar curved shank connected with and slidably adjustable on the first-named shank and provided with a transverse jaw, and means for clamping said supplemental handle or bar, consisting of notches or recesses formed therein, and a yoke pivotally connected with the main handle through which said supplemental handle or bar passes, substantially as shown and described.

In testimony that I claim the foregoing as my invention I have signed my name, in presence of the subscribing witnesses, this 12th day of October, 1898.

EDWARD DOBBINS.

Witnesses:
F. A. STEWART,
K. E. LANGTRY.